(12) United States Patent
    Xie et al.

(10) Patent No.: US 12,681,612 B2
(45) Date of Patent: Jul. 14, 2026

(54) DISPLAY PANEL AND DISPLAY DEVICE

(71) Applicant: Guangzhou China Star Optoelectronics Semiconductor Display Technology Co., LTd., Guangzhou (CN)

(72) Inventors: Yuanxiang Xie, Guangzhou (CN); Ke Mao, Guangzhou (CN); Yoonsung Um, Guangzhou (CN)

(73) Assignee: GUANGZHOU CHINA STAR OPTOELECTRONICS SEMICONDUCTOR DISPLAY TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 19/007,069

(22) Filed: Dec. 31, 2024

(65) Prior Publication Data

US 2026/0050351 A1    Feb. 19, 2026

(30) Foreign Application Priority Data

Aug. 16, 2024    (CN) .......................... 202411132632.3

(51) Int. Cl.
    *G06F 3/044*        (2006.01)
(52) U.S. Cl.
    CPC .................................. *G06F 3/0446* (2019.05)
(58) Field of Classification Search
    CPC .................................................... G06F 3/0446
    See application file for complete search history.

(56) References Cited

U.S. PATENT DOCUMENTS

| | | | | |
|---|---|---|---|---|
| 11,182,583 B2 * | 11/2021 | Yang | .................... | G06F 3/0412 |
| 11,543,903 B2 * | 1/2023 | Huang | ................. | G06F 3/0412 |
| 11,762,253 B2 * | 9/2023 | Yoshida | ........... | G02F 1/136286 |
| | | | | 349/33 |
| 12,468,200 B1 * | 11/2025 | Piao | ................. | G02F 1/136286 |
| 2017/0192573 A1 * | 7/2017 | Kim | ..................... | G06F 3/0412 |
| 2017/0205934 A1 * | 7/2017 | Lee | ..................... | H10D 86/441 |
| 2019/0319052 A1 * | 10/2019 | Yoshida | ............... | G02F 1/1368 |
| 2020/0272011 A1 * | 8/2020 | Yoshida | ............... | G06F 3/0412 |
| 2022/0137740 A1 * | 5/2022 | Morinaga | ......... | G02F 1/134309 |
| | | | | 345/174 |

(Continued)

FOREIGN PATENT DOCUMENTS

CN        212255943 U    * 12/2020

*Primary Examiner* — Amy Onyekaba
(74) *Attorney, Agent, or Firm* — PV IP PC; Christopher S. Ruprecht; Wei Te Chung

(57)        ABSTRACT

A display panel and a display device are provided. The display panel includes: multiple pixel units arranged adjacent to each other, located on a side of a substrate and including multiple pixel electrodes, in which the multiple pixel electrodes are arranged in an array to form pixel electrode rows and pixel electrode columns, and each pixel unit includes any two adjacent pixel electrode columns; touch signal lines, in which an orthographic projection of any touch signal line on the substrate falls within an orthographic projection of the pixel unit on the substrate; and first data signal lines, each first data signal line includes a first sub-data signal line segment and a second sub-data signal line segment, and an extension direction of the first sub-data signal line segment is non-collinear with an extension direction of and the second sub-data signal line segment.

19 Claims, 6 Drawing Sheets

(56) References Cited

U.S. PATENT DOCUMENTS

| 2022/0308694 | A1* | 9/2022 | Tong | G06F 3/0412 |
| 2022/0326583 | A1* | 10/2022 | Morinaga | G06F 3/0443 |
| 2022/0342500 | A1* | 10/2022 | Su | G06F 3/0412 |
| 2023/0126425 | A1* | 4/2023 | Yoshida | G02F 1/136227 |
| | | | | 349/33 |

* cited by examiner

100

100

200

300

DISPLAY PANEL AND DISPLAY DEVICE

CROSS-REFERENCE TO RELATED APPLICATION

This application claims the priority to Chinese Application No. 202411132632.3 filed on Aug. 16, 2024, the contents of which are incorporated herein by reference in their entirety.

TECHNICAL FIELD

The present application relates to a field of display technology, and in particular to a display panel and a display device.

BACKGROUND

Currently, for in-cell touch display panels, touch function is integrated into a display panel, a transparent common electrode in the display panel divided into multiple blocks, and a contact control signal line is connected to each common electrode block through a contact hole to monitor a touch signal of each block. In order to increase a resolution of a touch block, an area of the touch block needs to be reduced and the number of touch signal lines needs to be increased accordingly. Furthermore, in order to avoid uneven display caused by a presence or absence of the touch signal lines in sub-pixels, a virtual touch signal wiring is usually arranged to ensure that the touch signal lines are provided in each sub-pixel, resulting in a loss of a pixel aperture rate and a decrease in light transmittance of the display panel.

SUMMARY

In view of this, the present application provides a display panel and display device that can solve a problem of a reduced light transmittance caused by a decrease in pixel aperture rate.

In order to solve the above problem, the solutions provided by the present application are as follows.

The present application provides a display panel, and the display panel includes: a substrate; multiple pixel units, located on a side of the substrate and including multiple sub-pixels, in which each of the sub-pixels includes a pixel electrode, multiple pixel electrodes are arranged in an array to form pixel electrode rows extending in a first direction and pixel electrode columns extending in a second direction intersecting with the first direction, and each of the pixel units includes any two adjacent pixel electrode columns; multiple touch signal lines, located on a side of the substrate; in which each of the touch signal lines is arranged corresponding to the two adjacent pixel electrode columns of each pixel unit, and an orthographic projection of each of the touch signal lines on the substrate falls within an orthographic projection of each of the pixel units on the substrate; and first data signal lines, located on a side of the substrate; in which each of the first data signal lines includes a first sub-data signal line segment and a second sub-data signal line segment, one of the first sub-data signal line segment or the second sub-data signal line segment corresponds to one of any two adjacent pixel electrode rows, another of the first sub-data signal line segment or the second sub-data signal line segment corresponds to another of any two adjacent pixel electrode rows, and an extension direction of the first sub-data signal line segment is non-collinear with an extension direction of the second sub-data signal line segment.

In some embodiments of the present application, each of the touch signal lines includes a first sub-touch signal line segment and a second sub-touch signal line segment;

in which one of the first sub-touch signal line segment or the second sub-touch signal line segment corresponds to one of any two adjacent pixel electrode rows; another of the first sub-touch signal line segment or the second sub-touch signal line segment corresponds to another of any two adjacent pixel electrode rows; and an extension direction of the first sub-touch signal line segment is non-collinear with an extension direction of the second sub-touch signal line segment.

In some embodiments of the present application, in two adjacent pixel electrode rows, an orthographic projection of the first sub-touch signal line segment on the substrate falls within an orthographic projection of a Mth pixel electrode in one of the two adjacent pixel electrode rows on the substrate; and an orthographic projection of the second sub-touch signal line segment on the substrate falls within an orthographic projection of a (M+1)th pixel electrode in another of the two adjacent pixel electrode rows on the substrate; where M is a positive integer.

In some embodiments of the present application, in a same pixel electrode row, an orthographic projection of the first sub-touch signal line segment or the second sub-touch signal line segment on the substrate falls within an orthographic projection of one of any two adjacent pixel electrodes on the substrate, and falls outside an orthographic projection of another of any two adjacent pixel electrodes on the substrate.

In some embodiments of the present application, an orthographic projection of at least a part of the first sub-data signal line segment of the first data signal line on the substrate falls between an orthographic projection of a Mth pixel electrode and an orthographic projection of a (M+1)th pixel electrode in one of the two adjacent pixel electrode rows on the substrate; and an orthographic projection of at least a part of the second sub-data signal line segment on the substrate falls between an orthographic projection of a (M+1)th pixel electrode and an orthographic projection of a (M+2)th pixel electrode in another of the two adjacent pixel electrode rows on the substrate.

In some embodiments of the present application, the first sub-data signal line segment and the first sub-touch signal line segment are located in the same pixel electrode row; and the second sub-data signal line segment and the second sub-touch signal line segment are located in the same pixel electrode row.

In some embodiments of the present application, the first data signal lines are arranged at intervals in the first direction; in the first direction, an orthographic projection of a first sub-data signal line segment of a 1st first data signal line on the substrate is located on a side of an orthographic projection of a corresponding pixel electrode on the substrate, an orthographic projection of the second sub-data signal line segment of a last first data signal line on the substrate is located on a side of an orthographic projection of a corresponding pixel electrode on the substrate, and orthographic projections of first sub-data signal line segments and second sub-data signal line segments of remaining first data signal lines on the substrate are located between orthographic projections of two adjacent pixel electrodes on the substrate.

In some embodiments of the present application, in case that the number of the pixel electrode rows is even, the number of the first sub-touch signal line segments corresponding to one of the two adjacent pixel electrode columns is equal to the number of the second sub-touch signal line segments corresponding to another of the two adjacent pixel electrode columns.

In some embodiments of the present application, in two adjacent pixel electrode rows, an orthographic projection of the first sub-touch signal line segment on the substrate falls within an orthographic projection of a Mth pixel electrode in one of the two adjacent pixel electrode rows on the substrate; and an orthographic projection of the second sub-touch signal line segment on the substrate falls between an orthographic projection of a Mth pixel electrode and an orthographic projection of a (M+1)th pixel electrode in another of the two adjacent pixel electrode rows on the substrate; where M is a positive integer.

In some embodiments of the present application, in the same pixel electrode row, an orthographic projection of the first sub-touch signal line segment on the substrate falls within an orthographic projection of one of any two adjacent pixel electrodes on the substrate, and falls outside an orthographic projection of another of any two adjacent pixel electrodes on the substrate.

In some embodiments of the present application, in two adjacent pixel electrode rows, an orthographic projection of the first sub-data signal line segment on the substrate falls between an orthographic projection of a Mth pixel electrode and an orthographic projection of a (M+1)th pixel electrode in one of the two adjacent pixel electrode rows on the substrate; and an orthographic projection of the second sub-data signal line segment on the substrate falls within an orthographic projection of a (M+1)th pixel electrode in another of the two adjacent pixel electrode rows on the substrate.

In some embodiment of the present application, the first sub-touch signal line segment and the first sub-data signal line segment are located in the same pixel electrode row and are arranged adjacent to each other; and the second sub-touch signal line segment and the second sub-data signal line segment are located in the same pixel electrode row and are arranged adjacent to each other.

In some embodiment of the present application, the display panel further includes second data signal lines, and an orthographic projection of each of the second data signal lines on the substrate falls between orthographic projections of two adjacent pixel electrodes on the substrate; in which the orthographic projection of each of the second data signal lines on the substrate further falls between orthographic projections of one first data signal line and one touch signal line arranged adjacent to each other on the substrate.

In some embodiment of the present application, each of the first data signal lines includes a first sub-data signal line segment and a second sub-data signal line segment. In two adjacent pixel electrode columns, an orthographic projection of a first sub-data signal line segment of a Mth first data signal line on the substrate is located between an orthographic projection of a Mth pixel electrode and an orthographic projection of a (M+1)th pixel electrode in a pixel electrode row, where the first sub-data signal line segment is located, on the substrate, an orthographic projection of the first sub-data signal line segment of the Mth first data signal line and an orthographic projection of a first sub-data signal line segment of a (M+1)th first data signal line on the substrate are located on both sides of an orthographic projection of the (M+1)th pixel electrode in a pixel electrode row, where the first sub-data signal line segments are located, on the substrate in the first direction; an orthographic projection of a second sub-data signal line segment of the (M+1)th first data signal line on the substrate is located between an orthographic projection of the Mth pixel electrode and an orthographic projection of the (M+1)th pixel electrode in a pixel electrode row, where the second sub-data signal line segment is located, on the substrate; and an orthographic projection of the second sub-data signal line of a Mth first data signal line and an orthographic projection of the second sub-data signal line of the (M+1)th first data signal line on the substrate are located on both sides of an orthographic projection of the Mth pixel electrode in a pixel electrode row, where the second sub-data signal lines are located, on the substrate in the first direction.

In some embodiments of the present application, an orthographic projection of a first sub-touch signal line segment of a Mth touch signal line on the substrate falls on a first sub-data signal line segment of a Mth first data signal line; and an orthographic projection of a second sub-touch signal line segment of the Mth touch signal line on the substrate falls on a second sub-signal line segment of a (M+1)th first data signal line.

In some embodiments of the present application, the first data signal lines and the touch signal lines are arranged at different layers.

In some embodiments of the present application, each of the touch signal lines further includes a third sub-touch signal line segment. In the same touch signal line, the first sub-touch signal line segment is connected to the second sub-touch signal line segment through the third sub-touch signal line segment; and an orthographic projection of the third sub-touch signal line segment on the substrate falls outside an orthographic projection of the pixel electrode on the substrate.

In some embodiments of the present application, each of the first data signal lines further includes a third sub-data signal line segment. In the same first data signal line, the first sub-data signal line segment is connected to the second sub-data signal line segment through the third sub-data signal line segment; and an orthographic projection of the third sub-data signal line segment on the substrate falls outside an orthographic projection of the pixel electrode on the substrate.

In some embodiments of the present application, the first data signal lines and the touch signal lines are arranged at a same layer or different layers.

The present application further provides a display device, which includes the display panel as described above.

BRIEF DESCRIPTION OF THE DRAWINGS

In order that the technical solutions in the embodiments of the present application may be explained more clearly, a brief description is given below to the accompanying drawings for use in the description of the embodiments. It should be noted that the accompanying drawings in the following description are merely some of the embodiments of the present application, and other drawings may be obtained based on these drawings without involving any creative efforts to those skilled in the art.

5 6

Figure 4:
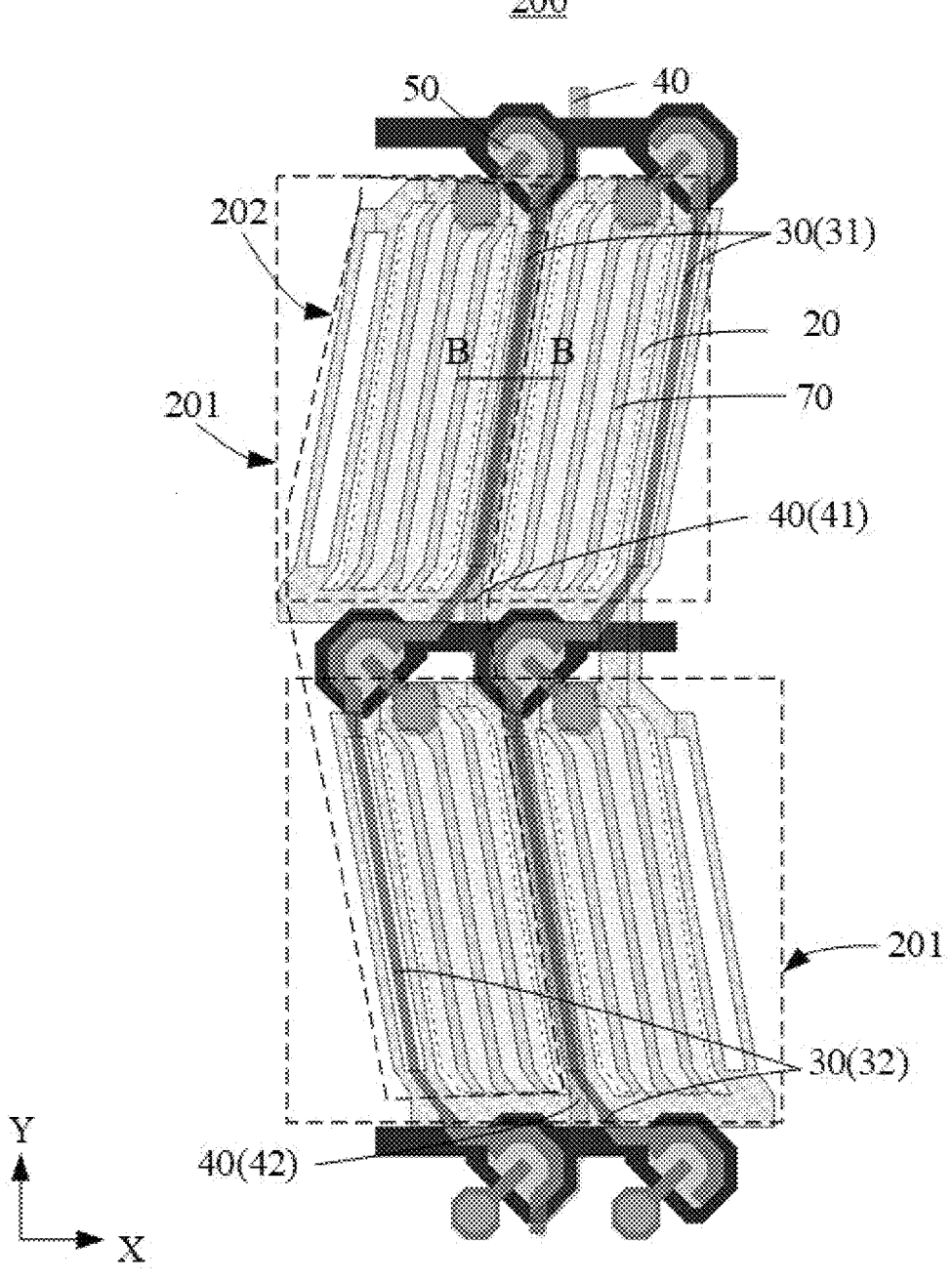

FIG. 4 a schematic diagram of a pixel structural of another display panel provided in the present application.

Figure 5:
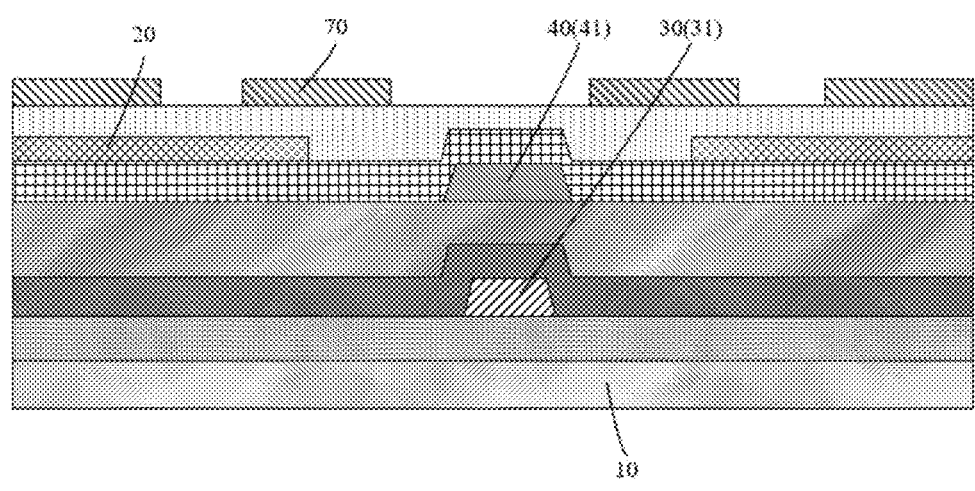

FIG. 5 is a cross-sectional view of the display panel shown in FIG. 4 taken along line B-B.

Figure 6:
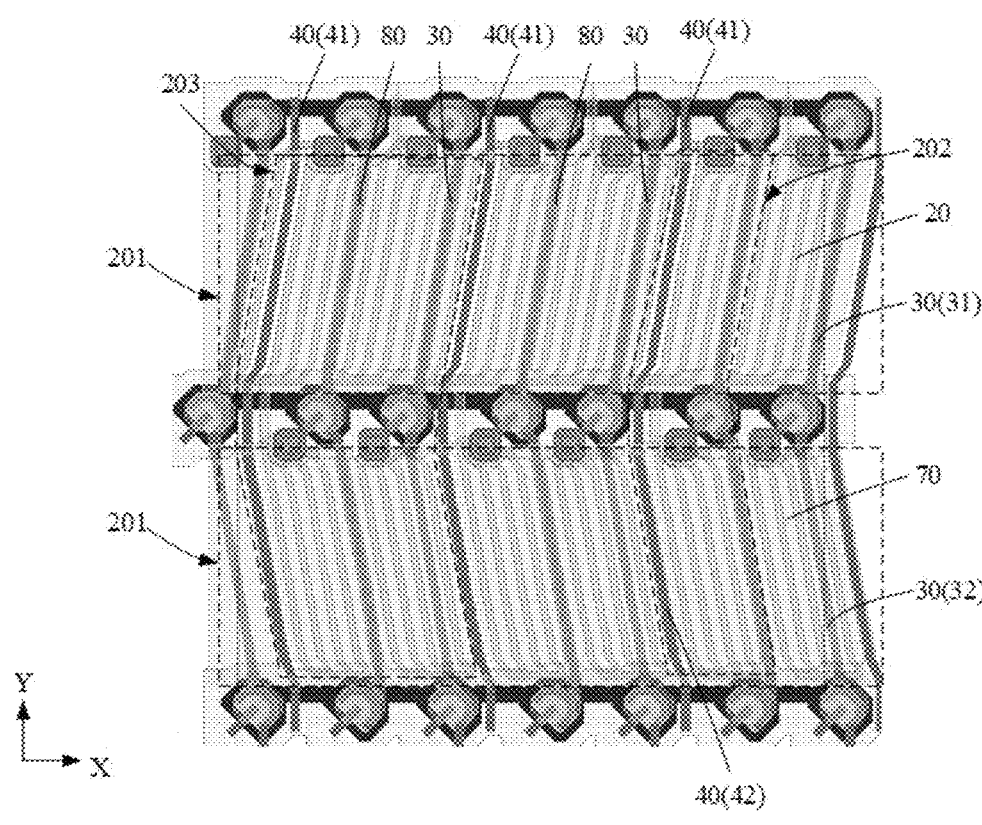

FIG. 6 is a top view of a local film layer of another display panel provided in the present application.

Figure 7:
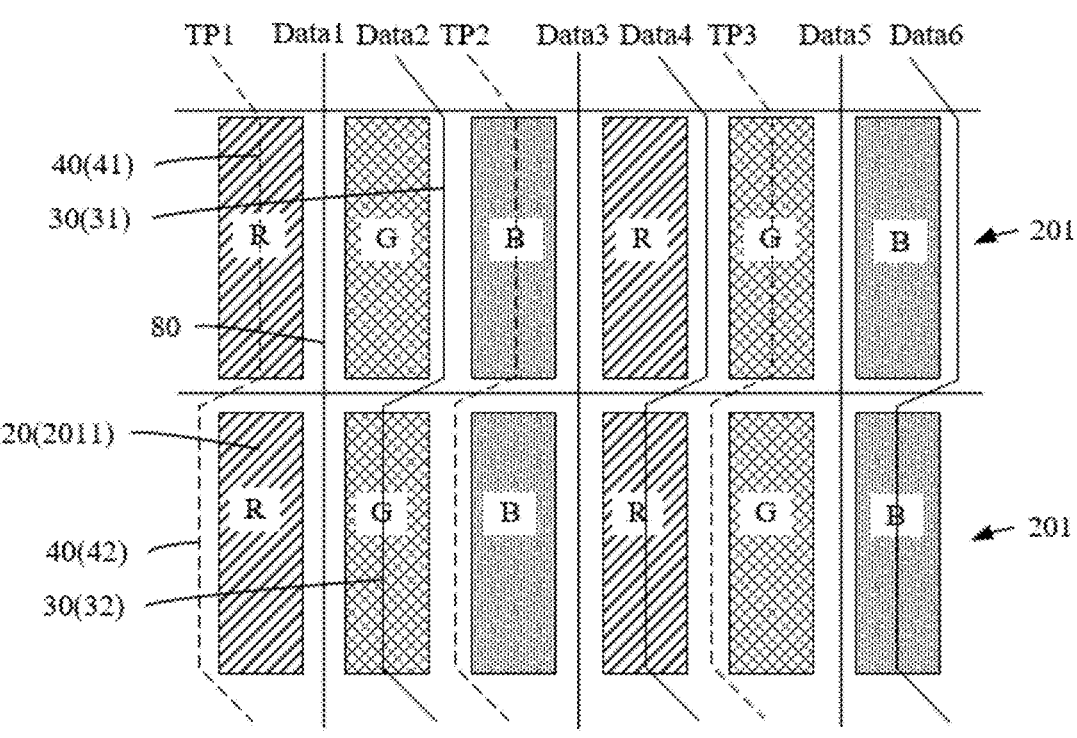

FIG. 7 is a schematic diagram of a distribution of sub-pixels, first data signal lines, second data lines, and touch signal lines of the display panel shown in FIG. 6.

DETAILED DESCRIPTION

In the following, the solutions in the embodiments of the present application are clearly and completely described with reference to the accompanying drawings. It should be noted that the described embodiments are merely a part of the embodiments of the present application, rather than all the embodiments. Based on the embodiments in the present application, all other embodiments obtained by a person skilled in the art without involving any inventive effort are within the scope of the present application.

In the description of the present application, it should be noted that, the orientation or positional relations specified by terms such as "on", "under", and the like, are based on the orientation or positional relations shown in the drawings, which are merely for convenience of description of the present application and to simplify description, but do not indicate or imply that the stated devices or members must have the particular orientation and be constructed and operated in a particular orientation, and thus these can not to be construed as limiting the present application. Furthermore, the terms "first", "second", and the like are only used for descriptive purposes and should not be construed as indicating or implying a relative importance or implicitly specifying the number of technical features indicated. In the description of the present application, "multiple" means two or more, unless otherwise expressly specified.

The present application may repeat reference numbers and/or reference letters in different embodiments for the purpose of simplification and clarity, and does not in itself indicate the relationship between the various embodiments and/or settings discussed.

Figure 1:
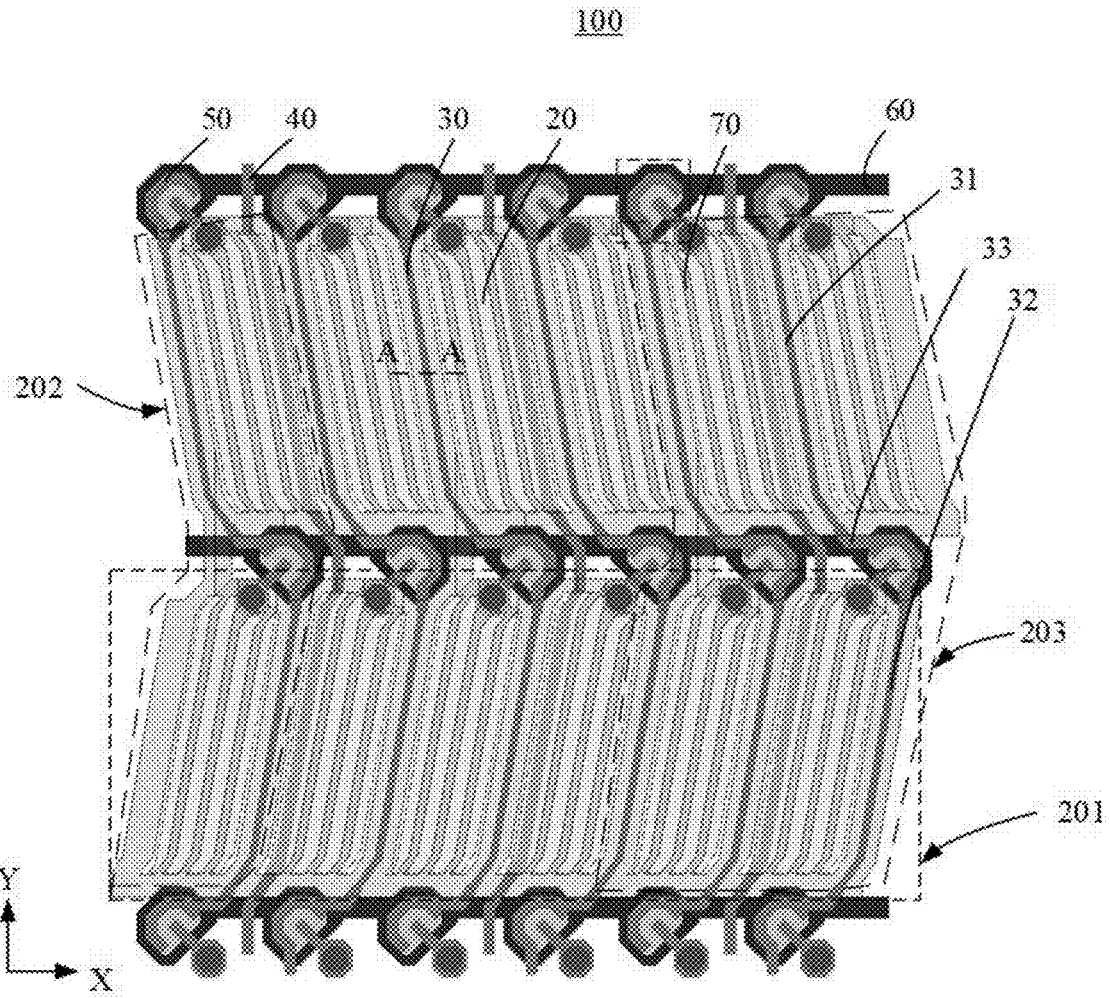
FIG. 1 is a schematic diagram of a pixel structure of a display panel provided in the present application.
Figure 2:
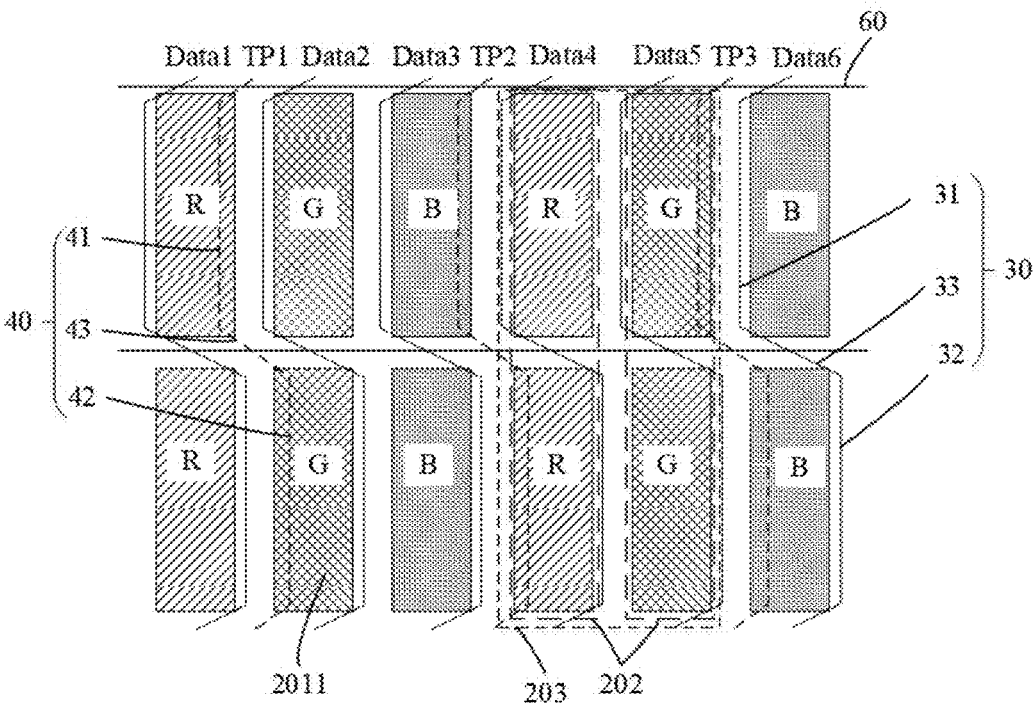
FIG. 2 is a schematic diagram of a distribution of sub-pixels, first data signal lines, and touch signal lines of the display panel shown in FIG. 1.
Figure 3:
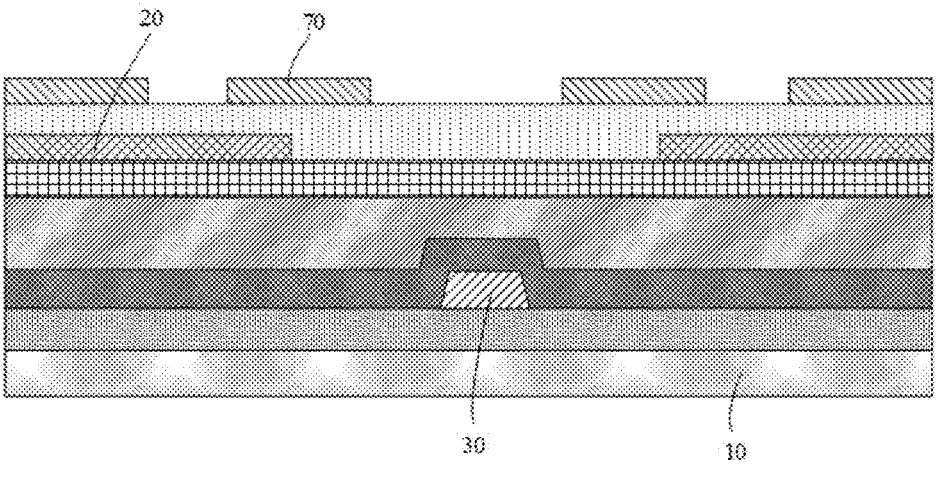
FIG. 3 is a cross-sectional view of the display panel shown in FIG. 1 taken along line A-A.

Referring to FIG. 1 to FIG. 3, the present application provides a display panel 100, the display panel 100 includes a substrate 10 (referring to FIG. 3), multiple pixel units 203, multiple first data signal lines 30, and multiple touch signal lines 40. The pixel units 203, the first data signal lines 30, and the touch signal lines 40 are located on the same side of the substrate 10.

The multiple pixel units 203 include multiple sub-pixels 2011, each sub-pixel 2011 includes a pixel electrode 20, and multiple pixel electrodes 20 are arranged in an array to form pixel electrode rows 201 extending along a first direction X and pixel electrode columns 202 extending along a second direction Y intersecting with the first direction X. Each of the pixel units 203 includes any two adjacent pixel electrode columns 202.

Furthermore, each of the first data signal lines 30 include a first sub-data signal line segment 31 and a second sub-data signal line segment 32, one of the first sub-data signal line segment 31 or the second sub-data signal line segment 32 corresponds to one of any two adjacent pixel electrode rows 201, another of the first sub-data signal line segment 31 or the second sub-data signal line segment 32 corresponds to another of any two adjacent pixel electrode rows, and an extension direction of the first sub-data signal line segment

31 is non-collinear with an extension direction of the second sub-data signal line segment 32.

In some embodiments of the present application, each of the first data signal lines 30 further include a third sub-data signal line segment 33. The first sub-data signal line segment 31 is connected to the second sub-data signal line segment 32 through the third sub-data signal line segment 33; and an orthographic projection, of the third sub-data signal line segment 33 on the substrate 10 falls outside orthographic projections, of the pixel electrodes 20 on the substrate 10.

In some embodiments of the present application, the third sub-data signal line segment 33 is arranged to be inclined.

In some embodiments of the present application, within two adjacent pixel electrode rows 201, an orthographic projection of at least a part of the first sub-data signal line segment 31 of the first data signal line 30 on the substrate 20 falls between an orthographic projection of a Mth pixel electrode 20 and an orthographic projection of a (M+1)th pixel electrode 20 in one of the two adjacent pixel electrode rows 201 on the substrate 10; and an orthographic projection of at least a part of the second sub-data signal line segment 32 of the first data signal line 30 on the substrate 10 falls between an orthographic projection of a (M+1)th pixel electrode 20 and an orthographic projection of a (M+2)th pixel electrode 20 in another of the two adjacent pixel electrode rows 201 on the substrate 10. Furthermore, M is a positive integer, such as 1, 2, 3, 4.

In some embodiments, the first data signal lines 30 are arranged at intervals in the first direction X; in the first direction X, an orthographic projection of the first sub-data signal line segment 31 of a 1st first data signal line 30 on the substrate 10 is located on a side of an orthographic projection of a corresponding pixel electrode 20, on the substrate 10, an orthographic projection of the second sub-data signal line segment 32 of a last first data signal line 30 on the substrate 10 is located on a side of an orthographic projection of a corresponding pixel electrode 20 on the substrate 10, and orthographic projections of the first sub-data signal line segment 31 and the second sub-data signal line segment 32 of remaining first data signal lines 30 on the substrate 10 is located between orthographic projections, of two adjacent pixel electrodes 20 on the substrate 10.

The items such as a 1st item and a last item mentioned below are in the order arranged from left to right in the first direction X, which is not limit the nature of the invention of the present application. For the direction and position of the first data signal lines 30, the following examples are given.

An orthographic projection of a first sub-data signal line 31 of a 1st first data signal line 30 (Data1) on the substrate 10 falls on a left side of an orthographic projection of a 1st pixel electrode 20 in an odd-numbered row, such as a 1st row, a 3rd row, and a 5th row, on the substrate 10. An orthographic projection of a second sub-data signal line 32 of the 1st first data signal line 30 (Data1) on the substrate 10 falls between orthographic projections of a 1st pixel electrode 20 and a 2nd pixel electrode 20 in an even-numbered row, such as a 2nd row, a 4th row, and a 6th row, on the substrate 10.

An orthographic projection of a first sub-data signal line 31 of a 2nd first data signal line 30 (Data2) on the substrate 10 falls between orthographic projections of the 1st pixel electrode 20 and a 2nd pixel electrode 20 in an odd-numbered row, such as a 1st row, a 3rd row, and a 5th row, on the substrate 10, and an orthographic projection of a second sub-data signal line 32 of the 2nd first data signal line 30 (Data2) on the substrate 10 falls between orthographic projections of a 2nd pixel electrode 20 and a 3rd pixel electrode 20 in an even-numbered row, such as a 2nd row, a 4th row, and a 6th row, on the substrate 10.

An orthographic projection of a first sub-data signal line 31 of a 3rd first data signal line 30 (Data3) on the substrate 10 falls between orthographic projections of a 2nd pixel electrode 20 and a 3rd pixel electrode 20 in an odd-numbered row, such as a 1st row, a 3rd row, and a 5th row, on the substrate 10, and an orthographic projection of a second sub-data signal line 32 of the 3rd first data signal line 30 (Data3) on the substrate 10 falls between orthographic projections of a 3rd pixel electrode 20 and a 4th pixel electrodes 20 in an even-numbered rows, such as a 2nd row, a 4th row, and a 6th row, on the substrate 10.

An orthographic projection, of a first sub-data signal line 31 of a 4th first data signal line 30 (Data4), on the substrate 10 falls between orthographic projections, of a 3rd pixel electrode 20 and a 4rd pixel electrode 20 in an odd-numbered row, such as a 1st row, a 3rd row, and a 5th row, on the substrate 10, and an orthographic projection, of a second sub-data signal line 32 of the 4th first data signal line 30 (Data4), on the substrate 10 falls between orthographic projections, of a 4th pixel electrode 20 and a 5th pixel electrode 20 in an even-numbered row, such as a 2rd row, a 4th row, and a 6th row on the substrate 10.

An orthographic projection, of a first sub-data signal line 31 of a 5th first data signal line 30 (Data5), on the substrate 10 falls between orthographic projections of a 3rd pixel electrode 20 and a 4th pixel electrode 20 in an odd-numbered row, such as a 1st row, a 3rd row, and a 5th row, on the substrate 10, and an orthographic projection, of a second sub-data signal line 32 of the 5th first data signal line 30 (Data5) on the substrate 10 falls between orthographic projections of a 5th pixel electrode 20 and a 6th pixel electrode 20 in an even-numbered row, such as a 2nd row, a 4th row, and a 6th row, on the substrate 10.

An orthographic projection of a first sub-data signal line 31 of a 6th first data signal line 30 (Data6) on the substrate 10 falls between orthographic projections of a 5th pixel electrode 20 and a 6th pixel electrode 20 in an odd-numbered row, such as a 1st row, a 3rd row, and a 5th row, on the substrate 10, and an orthographic projection of a second sub-data signal line 32 of the 6th first data signal line 30 (Data6) on the substrate 10 falls on a right side of an orthographic projection of a 6th pixel electrode 20 in an even-numbered row, such as a 2nd row, a 4th row, and a 6th row, on the substrate 10.

Furthermore, each of the touch signal lines 40 is arranged corresponding to two pixel electrode columns 202 of each pixel unit 203, and an orthographic projection of each of the touch signal lines 40 on the substrate 10 falls within an orthographic projection of each of the pixel units 203 on the substrate. That is, in the display panel 100 provided by the present application, virtual touch signal lines are not included, and an opening area of the display panel 100 is not occupied by the virtual signal lines, so that an aperture rate of the display panel 100 is increased, and a light transmittance is increased, thereby improving a brightness of the display panel 100 and reducing power consumption.

Furthermore, each of the touch signal lines 40 includes a first sub-touch signal line segment 41 and a second sub-touch signal line segment 42; one of the first sub-touch signal line segment 41 or the second sub-touch signal line segment 42 corresponds to one of any two adjacent pixel electrode rows 201; another of the first sub-touch signal line segment 41 or the second sub-touch signal line segment 42 corresponds to another of any two adjacent pixel electrode rows 201; and an extension direction of the first sub-touch signal line segment 41 is non-collinear with an extension direction of the second sub-touch signal line segment 42.

Furthermore, for the same touch signal line 40, in two adjacent pixel electrode rows 201, an orthographic projection of the first sub-touch signal line segment 41 on the substrate 10 falls within an orthographic projection of a Mth pixel electrode 20 in one of the two adjacent pixel electrode rows 201 on the substrate 10; and an orthographic projection of the second sub-touch signal line segment 42 on the substrate 10 falls within an orthographic projection of a (M+1)th pixel electrode 20 in another of the two adjacent pixel electrode rows 201 on the substrate 10.

Furthermore, in the same pixel electrode row 201, an orthographic projection of the first sub-touch signal line segment 41 or the second sub-touch signal line segment 42 on the substrate 10 falls within an orthographic projection of one of any two adjacent pixel electrodes 20 on the substrate 10, and falls outside an orthographic projection of another of any two adjacent pixel electrodes 20 on the substrate 10. That is, in two adjacent sub-pixels, there is only one touch signal line 40, and the touch signal line 40 only overlaps with one of the sub-pixels.

Furthermore, two first data signal lines 30 are arranged between the two adjacent touch signal lines 40. A pixel electrode 20 is further arranged between the two pixel electrodes 20 corresponding to the two adjacent touch signal lines 40, and the pixel electrode 20 has no coverage relationship with the touch signal line 40.

The items such as a 1st item and a last item mentioned below are in the order arranged from left to right in the first direction X, which is not limit the nature of the invention of the present application. For the direction and position of the touch signal line 40, the following examples are given.

An orthographic projection of a first sub-touch signal line segment 41 of a 1st touch signal line 40 (TP1) on the substrate 10 falls on an orthographic projection of a 1st pixel electrode 20 in an odd-numbered row, such as a 1st row, a 3rd row, and a 5th row, on the substrate 10. An orthographic projection of a second sub-touch signal line 42 of the 1st touch signal line 40 (TP1) on the substrate 10 falls on an orthographic projection of a 2nd pixel electrode 20 in an even-numbered row, such as a 2nd row, a 4th row, and a 6th row, on the substrate 10.

An orthographic projection of a first sub-touch signal line segment 41 of a 2nd first touch signal line 40 (TP2) on the substrate 10 falls on an orthographic projection of a 3rd pixel electrode 20 in an odd-numbered row, such as a 1st row, a 3rd row, and a 5th row, on the substrate 10. An orthographic projection of a second sub-touch signal line 42 of the 2nd touch signal line 40 (TP2) on the substrate 10 falls on an orthographic projection of a 4th pixel electrode 20 in an even-numbered row, such as a 2nd row, a 4th row, and a 6th row, on the substrate 10.

An orthographic projection of a first sub-touch signal line segment 41 of a 3rd touch signal line 40 (TP3) on the substrate 10 falls on an orthographic projection of a 5th pixel electrode 20 in an odd-numbered row, such as a 1st row, a 3rd row, and a 5th row, on the substrate 10. An orthographic projection of a second sub-touch signal line 42 of the 3rd touch signal line 40 (TP3) on the substrate 10 falls on an orthographic projection of a 6th pixel electrode 20 in an even-numbered row, such as a 2nd row, a 4nd row, and a 6nd row, on the substrate 10.

In some embodiments of the present application, each of the touch signal lines 40 further includes a third sub-touch signal line segment 43, and the first sub-touch signal line segment 41 is connected to the second sub-touch signal line segment 42 through the third sub-touch signal line segment 43. An orthographic projection of the third sub-touch signal line segment 43 on the substrate 10 falls outside an orthographic projections of the pixel electrode 20 on the substrate 10.

In some embodiments of the present application, the third sub-touch signal line segment 43 is arranged to be inclined.

Referring to FIG. 1 and FIG. 2, the display panel 100 further includes multiple transistors 50 arranged in an array. Each of two terminals of a first sub-data signal line segment 31 of each first data signal line 30 is connected to one transistor 50. Each of two terminals of a second sub-data signal line 32 of each first data signal line 30 is connected to one transistor 50. Two adjacent terminals of a first sub-data signal line 31 and a second sub-data signal line 32 of each first data signal line 30 are connected to the same transistor 50.

In some embodiments of the present application, the first data signal lines 30 are in a shape similar to letter "S", and two adjacent transistors 50 among multiple transistors 50 connected to the same first data signal line 30 are centrally symmetrical. As such, the touch signal line 40 may be arranged between two adjacent sub-pixel columns in a staggered manner, that is, the touch signal line 40 alternates between the two adjacent sub-pixel columns.

In some embodiments of the present application, the display panel 100 further includes scanning lines 60 extending along the first direction X. Each of the scanning lines 60 is located between two adjacent pixel electrode rows 201, and a scanning line 60 is arranged on two sides of each of the pixel electrode rows 201. Each of the scanning lines 60 is connected to multiple transistors 50 located in the same pixel electrode row. An orthogonal projection of the third sub-data signal line segment 33 and an orthogonal projection of the third sub-touch signal line segment 43 on the substrate 10 are intersected with an orthogonal projection of each of the scanning lines 60 on the substrate 10.

In some embodiments of the present application, the first data signal lines 30 and the touch signal lines 40 may be arranged at the same layer or at different layers.

Referring to FIG. 1 and FIG. 3, in some embodiments of the present application, the display panel 100 further includes common electrodes 70, and the common electrodes 70 are located on a side of the substrate 10 and are located on a side of the pixel electrodes 20. An orthographic projection of each of the common electrodes 70 on the substrate 10 at least partially covers an orthographic projection of each of the pixel electrodes 20 on the substrate 10 to form an electric field.

Furthermore, each of the common electrodes 70 includes multiple common blocks, and the common blocks of each of the common electrodes 70 are connected to multiple touch signal lines 40. In this embodiment, multiple common blocks of each of the common electrodes 70 are connected with multiple touch signal lines 40 through connecting holes to monitor a touch signal of each block.

Referring to FIG. 2 and FIG. 3, in some embodiments of the present application, the display panel 100 may further include a liquid crystal layer (not shown) and a color film substrate (not shown). The liquid crystal layer is located on a side, away from the substrate 10, of the pixel electrodes 20 and the common electrodes 70, and the color film substrate is located on a side, away from the pixel electrodes 20 and the common electrodes 70, of the liquid crystal layer. Other film layers are arranged among the substrate 10, the pixel electrodes 20, and the common electrodes 70, which are not described in detail herein.

In this embodiment, based on pixels, repetition units of the pixels of the display panel 100 includes two pixel units 203 (each pixel unit includes two pixel electrode columns 202). In case that multiple sub-pixels 2011 are arranged in an array in an order of a red sub-pixel R, a green sub-pixel G and a blue sub-pixel B, three pixel units 203 correspond to two types of arrangements of RGB, and correspond to three touch signal lines 40 and six first data signal lines 30, forming a 2P3T structure, in which P refers to a "pixel unit" composed of RGB sub-pixels and T refers to a touch signal line.

In some embodiments of the present application, the display panel 100 is an in-cell touch display panel. The other specific film structure of the display panel 100 is the same or similar to the specific film structure of the in-cell touch display panel commonly used in the existing technology, which are not described in detail herein.

Furthermore, a brightness of each sub-pixel with a corresponding touch signal line 40 is set to 1, and a brightness of each sub-pixel with no corresponding touch signal line 40 is set to 2. Since in the present application, the first data signal lines 30 and the touch signal lines 40 are arranged as described above, the brightness of the sub-pixels corresponding to each pixel electrode column 202 is alternately arranged in 1, 2, 1, 2, 1, 2 . . . . In case that the display panel 100 includes an even number of pixel electrode rows 201, a total brightness of the sub-pixels corresponding to all pixel electrode columns 202 is equal. As such, display effects of the sub-pixels corresponding to all pixel electrode columns 202 are the same, so that a problem of uneven vertical display caused by a reduction in the number of touch signal lines 40 (no virtual touch signal lines are arranged) can be solved to a certain extent.

In addition, in the display panel 100 provided by the present application, the first data signal lines 30 and the touch signal lines 40 are arranged as described above, and no virtual touch signal lines are arranged. As such, an opening area of the display panel is not occupied by the virtual touch signal lines, so that not only the problem of uneven display can be solved to a certain extent, but also the aperture rate of the display panel is increased and the light transmittance is increased.

Referring to FIG. 4 and FIG. 5, the present application further provides a display panel 200. A structure of the display panel 200 is basically the same as a structure of the display panel 100, except the relative positions of the first data signal lines 30 and the touch signal lines 40 of the display panel 200.

Furthermore, in two adjacent pixel electrode columns 202, an orthographic projection of a first sub-data signal line segment 31 of a Mth first data signal line 30 on the substrate 10 is located between an orthographic projection of a Mth pixel electrode 20 and an orthographic projection of a (M+1)th pixel electrode 20 in a pixel electrode row 201, where the first sub-data signal line segment is located on the substrate; and an orthographic projection of the first sub-data signal line segment 31 of the Mth first data signal line 30 and an orthographic projection of a first sub-data signal line segment 31 of a (M+1)th first data signal line 30 on the substrate 10 are located on both sides of an orthographic projection of the (M+1)th pixel electrode 20 in a pixel electrode row, where the first sub-data signal line segments are located, on the substrate 10 in the first direction X.

Furthermore, in two adjacent pixel electrode columns 202, an orthographic projection of a second sub-data signal line segment 32 of the (M+1)th first data signal line 30 on the substrate 10 is located between an orthographic projection of the Mth pixel electrode 20 and an orthographic projection of the (M+1)th pixel electrode 20 in a pixel electrode row 201, where the second sub-data signal line segment is located, on the substrate 10; and an orthographic projection of the second sub-data signal line segment 32 of a Mth first data signal line 30 and an orthographic projection of the second sub-data signal line segment 32 of the (M+1)th first data signal line 30 on the substrate 10 are located on both sides of an orthographic projection of the Mth pixel electrode 20 in a pixel electrode row 201, where the second sub-data signal lines are located, on the substrate 10 in the first direction X.

Furthermore, an orthographic projection of the first sub-touch signal line segment 41 of a Mth touch signal line on the substrate 10 falls on a first sub-data signal line segment 31 of a Mth first data signal line 30; and an orthographic projection of a second sub-touch signal line segment 42 of the Mth touch signal line 40 on the substrate 10 falls on a second sub-signal line segment 42 of a (M+1)th first data signal line 30.

In this embodiment, the first data signal lines 30 and the touch signal lines 40 are arranged at different layers.

In the display panel 200 provided in this embodiment, the first data signal lines 30 are wound in a shape similar to letter "S", a part of each of the touch signal lines 40 is overlapped with a part of one first data signal line 30, and another part of each of the touch signal lines 40 is overlapped with a part of another adjacent first data signal line 30, so that not only virtual touch signal lines can be removed to increase an aperture rate of the display panel, but also a capacitance load of each of the first data signal lines 30 is reduced. In addition, since an orthographic projection of each of the touch signal lines 40 on the substrate 10 is located between orthographic projections of two adjacent pixel electrodes 20 on the substrate 10, the touch signal lines 40 would not affect the brightness of any sub-pixel, so that good display effect, low power consumption, and low backlight cost of the display panel 200 can be achieved.

Referring to FIG. 6 and FIG. 7, the present application further provides a display panel 300. A structure of the display panel 300 is basically the same as a structure of the display panel 100, except the relative positions of the first data signal lines 30 and the touch signal lines 40 of the display panel 300.

Furthermore, for the same touch signal line 40 and in two adjacent pixel electrode rows 201, an orthographic projection of the first sub-touch signal line segment 41 on the substrate 10 falls within an orthographic projection of a Mth pixel electrode 20 in one of the two adjacent pixel electrode rows 201 on the substrate 10; and an orthographic projection of the second sub-touch signal line segment 42 on the substrate 10 falls between an orthographic projection of a Mth pixel electrode 20 and an orthographic projection of a (M+1)th pixel electrode 20 in another of the two adjacent pixel electrode rows 201 on the substrate 10.

Furthermore, in the same pixel electrode row 201, an orthographic projection of the first sub-touch signal line segment 41 on the substrate 10 falls within an orthographic projection of one of any two adjacent pixel electrodes 20 on the substrate 10, and falls outside an orthographic projection of another of any two adjacent pixel electrodes 20 on the substrate 10.

Furthermore, for the same first data signal line 30 and in two adjacent pixel electrode rows 201, an orthographic projection of a first sub-data signal line segment 31 on the substrate 10 falls between an orthographic projection of a Mth pixel electrode 20 and an orthographic projection of a (M+1)th pixel electrode 20 in one of the two adjacent pixel electrode rows 201 on the substrate 10; and an orthographic projection of a second sub-data signal line segment 32 on the substrate 10 falls within an orthographic projection of a (M+1)th pixel electrode 20 in another of the two adjacent pixel electrode rows 201 on the substrate 10.

Furthermore, the first sub-touch signal line segment 41 and the first sub-data signal line segment 31 are located in the same pixel electrode row 201 and adjacent to each other; and the second sub-touch signal line segment 42 and the second sub-data signal line segment 32 are located in the same pixel electrode row 201 and are adjacent to each other.

In this embodiment, the display panel 100 further includes second data signal lines 80, and an orthographic projection of each of the second data signal lines 80 on the substrate 10 falls between orthographic projections of two adjacent pixel electrodes 20 on the substrate 10; and the orthographic projection of each of the second data signal lines 80 on the substrate 10 further falls between orthographic projections of one first data signal line 30 and one touch signal line 40 arranged adjacent to each other on the substrate 10.

In this embodiment, some of data lines are configured for balancing the brightness of the display panel, and a remaining part of the data lines are not arranged in a staggered manner. That is, the number of the first data signal lines 30 of the display panel 300 is reduced by half, and a sum of the number of the first data signal lines 30 and the number of the second data signal lines 80 is equal to the number of the first data signal lines of the display panel 100 and the display panel 200.

In the display panel 300 provided in this embodiment, the first sub-touch signal line 41 of each of the touch signal lines 40 is arranged opposite to one of the pixel electrodes 20; gaps between the first sub-data signal line 31 of the first data signal line 30 adjacent to the touch signal line 40 and two adjacent pixel electrodes are arranged opposite to each other, gaps between the second sub-touch signal line 42 of the touch signal line 40 and two adjacent pixel electrodes are arranged opposite to each other; and the second sub-data signal line 32 of the first data signal line 30 adjacent to the touch signal line 40 is arranged opposite to one of the pixel electrodes 20. As such, the first data signal lines 30 and the touch signal lines 40 are wound in a shape similar to letter "S". In one pixel electrode column, one touch signal line 40 is arranged corresponding to a pixel electrode in an odd-numbered (or even-numbered) pixel electrode row 201, and in another adjacent pixel electrode column, one first data signal line 30 is arranged corresponding to a pixel electrode in an even-numbered (or odd-numbered) pixel electrode row 201. As such, virtual touch signal lines may be replaced by the first data signal lines 30. Therefore, the difference in total brightness between the adjacent pixel electrode columns of the display panel 300 is not significant, so that an influence of uneven vertical display caused by the reduction in the number of the TP (touch signal) lines can be solved to a certain extent.

The present application further provides a display device (not shown), and the display device includes the display panel 100/200/300 as described above. The display device may be a mobile phone, a computer, a watch, or any other electronic devices.

In the display panel and display device provided by the present application, any two adjacent pixel electrode columns are served as a pixel unit, and an orthographic projection of any of the touch signal lines on the substrate falls within an orthographic projection of the pixel unit on the substrate, and each of the first data signal lines include a first sub-data signal line and a second sub-data signal line. One of the first sub-data signal line and the second sub-data signal line corresponds to one of any two adjacent pixel electrode rows, and another of the first sub-data signal line and the second sub-data signal line corresponds to another of any two adjacent pixel electrode rows. An extension direction of the first sub-data signal line segment is non-collinear with an extension direction of the second sub-data signal line segment, that is, the first sub-data signal line segment and the second sub-data signal line segment of the first data signal line are arranged in a staggered manner. The pixel electrodes of the two adjacent pixel electrode columns share one touch signal line, so that the number of touch signal lines is halved. In the display panel provided by the present application, virtual touch signal lines are not included, and an opening area of the display panel is not occupied by the virtual signal lines, so that an aperture rate of the display panel is increased, and a light transmittance is increased.

In summary, although the present application has been disclosed as above embodiments, the above embodiments are not used to limit the present application. Those skilled in this field may make various changes and embellishments without deviating from the nature and scope of the present application. Therefore, the scope of protection of the present application is subject to the scope defined by the claims.

What is claimed is:

1. A display panel, comprising:
a substrate;
a plurality of pixel units arranged adjacent to each other, located on a side of the substrate, and comprising a plurality of sub-pixels, wherein each sub-pixel of the plurality of sub-pixels comprises a pixel electrode, a plurality of pixel electrodes are arranged in an array to form pixel electrode rows extending in a first direction and pixel electrode columns extending in a second direction intersecting with the first direction, and each of the pixel units comprises any two adjacent pixel electrode columns;
a plurality of touch signal lines, located on a side of the substrate; wherein each touch signal line of the plurality of touch signal lines is arranged corresponding to two adjacent pixel electrode columns of each of the pixel units, and an orthographic projection of each of the touch signal lines on the substrate falls within an orthographic projection of each of the pixel units on the substrate; and
a plurality of first data signal lines, located on a side of the substrate;
wherein each first data signal line of the plurality of first data signal lines comprises a first sub-data signal line segment and a second sub-data signal line segment, one of the first sub-data signal line segment or the second sub-data signal line segment corresponds to one of any two adjacent pixel electrode rows, another of the first sub-data signal line segment or the second sub-data signal line segment corresponds to another of any two adjacent pixel electrode rows, and an extension direction of the first sub-data signal line segment is non-collinear with an extension direction of the second sub-data signal line segment;
wherein each of the touch signal lines comprises a first sub-touch signal line segment and a second sub-touch signal line segment; and
wherein for a same touch signal line and in two adjacent pixel electrode rows, an orthographic projection of the first sub-touch signal line segment on the substrate falls within an orthographic projection of a Mth pixel electrode in one of the two adjacent pixel electrode rows on the substrate; and an orthographic projection of the second sub-touch signal line segment on the substrate falls within an orthographic projection of a (M+1)th pixel electrode in another of the two adjacent pixel electrode rows on the substrate; wherein M is a positive integer.

2. The display panel of claim 1,
wherein one of the first sub-touch signal line segment or the second sub-touch signal line segment corresponds to one of any two adjacent pixel electrode rows;
another of the first sub-touch signal line segment or the second sub-touch signal line segment corresponds to another of any two adjacent pixel electrode rows;
and an extension direction of the first sub-touch signal line segment is non-collinear with an extension direction of the second sub-touch signal line segment.

3. The display panel of claim 2, wherein each of the first data signal lines comprises a first sub-data signal line segment and a second sub-data signal line segment, in two adjacent pixel electrode columns,
an orthographic projection of a first sub-data signal line segment of a Mth first data signal line on the substrate is located between an orthographic projection of a Mth pixel electrode and an orthographic projection of a (M+1)th pixel electrode in a pixel electrode row, where the first sub-data signal line segment of the Mth first data signal line is located, on the substrate;
orthographic projections of the first sub-data signal line segment of the Mth first data signal line and a first sub-data signal line segment of a (M+1)th first data signal line on the substrate are located on both sides of an orthographic projection of the (M+1)th pixel electrode in a pixel electrode row, where the first sub-data signal line segment of the Mth first data signal line and the first sub-data signal line segment of the (M+1)th first data signal line are located, on the substrate in a first direction;
an orthographic projection of a second sub-data signal line segment of the (M+1)th first data signal line on the substrate is located between orthographic projections of the Mth pixel electrode and the (M+1)th pixel electrode in a pixel electrode row, where the second sub-data signal line segment of the (M+1)th first data signal line is located, on the substrate; and
orthographic projections of a second sub-data signal line of the Mth first data signal line and the second sub-data signal line of the (M+1)th first data signal line on the substrate are located on both sides of an orthographic projection of the Mth pixel electrode in a pixel electrode row, where the second sub-data signal line of the Mth first data signal line and the second sub-data signal line of the (M+1)th first data signal line are located, on the substrate in the first direction.

4. The display panel of claim 3, wherein an orthographic projection of a first sub-touch signal line segment of a Mth touch signal line on the substrate falls on the first sub-data signal line segment of the Mth first data signal line; and
an orthographic projection of a second sub-touch signal line segment of the Mth touch signal line on the substrate falls on a second sub-signal line segment of the (M+1)th first data signal line.

5. The display panel of claim 4, wherein the first data signal lines and the touch signal lines are arranged at different layers.

6. The display panel of claim 2, wherein each of the touch signal lines further comprises a third sub-touch signal line segment, and in a same touch signal line, the first sub-touch signal line segment is connected to the second sub-touch signal line segment through the third sub-touch signal line segment;

wherein an orthographic projection of the third sub-touch signal line segment on the substrate falls outside an orthographic projection of the pixel electrode on the substrate.

7. The display panel of claim 1, wherein in a same pixel electrode row, an orthographic projection of the first sub-touch signal line segment or the second sub-touch signal line segment on the substrate falls within an orthographic projection of one of any two adjacent pixel electrodes on the substrate, and falls outside an orthographic projection of another of any two adjacent pixel electrodes on the substrate.

8. The display panel of claim 1, wherein in the two adjacent pixel electrode rows, an orthographic projection of at least a part of the first sub-data signal line segment of the first data signal line on the substrate falls between an orthographic projection of a Mth pixel electrode and an orthographic projection of a (M+1)th pixel electrode in one of the two adjacent pixel electrode rows on the substrate; and an orthographic projection of at least a part of the second sub-data signal line segment of the first data signal line on the substrate falls between an orthographic projection of a (M+1)th pixel electrode and an orthographic projection of a (M+2)th pixel electrode in another of the two adjacent pixel electrode rows on the substrate.

9. The display panel of claim 8, wherein the first sub-data signal line segment and the first sub-touch signal line segment are located in a same pixel electrode row; and the second sub-data signal line segment and the second sub-touch signal line segment are located in a same pixel electrode row.

10. The display panel of claim 8, wherein the plurality of first data signal lines are arranged at intervals in the first direction;

wherein in the first direction, an orthographic projection of a first sub-data signal line segment of a 1st first data signal line on the substrate is located on a side of an orthographic projection of a corresponding pixel electrode on the substrate;

an orthographic projection of a second sub-data signal line segment of a last first data signal line on the substrate is located on a side of an orthographic projection of a corresponding pixel electrode on the substrate; and orthographic projections of the first sub-data signal line segments and the second sub-data signal line segments of remaining first data signal lines on the substrate are located between orthographic projections of two adjacent pixel electrodes on the substrate.

11. The display panel of claim 1, wherein in a case that a number of the pixel electrode rows is even, a number of the first sub-touch signal line segments corresponding to one of the two adjacent pixel electrode columns is equal to a number of the second sub-touch signal line segments corresponding to another of the two adjacent pixel electrode columns.

12. The display panel of claim 1, wherein each of the first data signal lines further comprises a third sub-data signal line segment, and in a same first data signal line, the first sub-data signal line segment is connected to the second sub-data signal line segment through the third sub-data signal line segment;

wherein an orthographic projection of the third sub-data signal line segment on the substrate falls outside an orthographic projection of the pixel electrode on the substrate.

13. The display panel of claim 1, wherein the first data signal line and the touch signal line are arranged on a same layer or different layers.

14. A display panel, comprising:

a substrate;

a plurality of pixel units arranged adjacent to each other, located on a side of the substrate, and comprising a plurality of sub-pixels, wherein each sub-pixel of the plurality of sub-pixels comprises a pixel electrode, a plurality of pixel electrodes are arranged in an array to form pixel electrode rows extending in a first direction and pixel electrode columns extending in a second direction intersecting with the first direction, and each of the pixel units comprises any two adjacent pixel electrode columns;

a plurality of touch signal lines, located on a side of the substrate; wherein each touch signal line of the plurality of touch signal lines is arranged corresponding to two adjacent pixel electrode columns of each of the pixel units, and an orthographic projection of each of the touch signal lines on the substrate falls within an orthographic projection of each of the pixel units on the substrate; and a plurality of first data signal lines, located on a side of the substrate;

wherein each first data signal line of the plurality of first data signal lines comprises a first sub-data signal line segment and a second sub-data signal line segment, one of the first sub-data signal line segment or the second sub-data signal line segment corresponds to one of any two adjacent pixel electrode rows, another of the first sub-data signal line segment or the second sub-data signal line segment corresponds to another of any two adjacent pixel electrode rows, and an extension direction of the first sub-data signal line segment is non-collinear with an extension direction of the second sub-data signal line segment;

wherein each of the touch signal lines comprises a first sub-touch signal line segment and a second sub-touch signal line segment; and wherein for a same touch signal line and in two adjacent pixel electrode rows, an orthographic projection of the first sub-touch signal line segment on the substrate falls within an orthographic projection of a Mth pixel electrode in one of the two adjacent pixel electrode rows on the substrate; and an orthographic projection of the second sub-touch signal line segment on the substrate falls between an orthographic projection of the Mth pixel electrode and an orthographic projection of a (M+1)th pixel electrode in another of the two adjacent pixel electrode rows on the substrate;

wherein M is a positive integer.

15. The display panel of claim 14, wherein in a same pixel electrode row, an orthographic projection of the first sub-touch signal line segment on the substrate falls within an orthographic projection of one of any two adjacent pixel electrodes on the substrate, and falls outside an orthographic projection of another of any two adjacent pixel electrodes on the substrate.

16. The display panel of claim 15, wherein for a same first data signal line and in two adjacent pixel electrode rows, an orthographic projection of the first sub-data signal line segment on the substrate falls between an orthographic projection of a Mth pixel electrode and an orthographic projection of a (M+1)th pixel electrode in one of the two adjacent pixel electrode rows on the substrate; and an orthographic projection of the second sub-data signal line segment on the substrate falls within an orthographic projection of a (M+1)th pixel electrode in another of the two adjacent pixel electrode rows on the substrate.

17. The display panel of claim 16, wherein the first sub-touch signal line segment and the first sub-data signal line segment are located in a same pixel electrode row and are arranged adjacent to each other; and the second sub-touch signal line segment and the second sub-data signal line segment are located in a same pixel electrode row and are arranged adjacent to each other.

18. The display panel of claim 16, further comprising second data signal lines, and an orthographic projection of each of the second data signal lines on the substrate falls between orthographic projections of two adjacent pixel electrodes on the substrate;

wherein the orthographic projection of each of the second data signal lines on the substrate further falls between orthographic projections of one first data signal line and one touch signal line arranged adjacent to each other on the substrate.

19. A display device, comprising a display panel, wherein the display panel comprises:

a substrate;

a plurality of pixel units arranged adjacent to each other, located on a side of the substrate, and comprising a plurality of sub-pixels, wherein each sub-pixel of the plurality of sub-pixels comprises a pixel electrode, a plurality of pixel electrodes are arranged in an array to form pixel electrode rows extending in a first direction and pixel electrode columns extending in a second direction intersecting with the first direction, and each of the pixel units comprises any two adjacent pixel electrode columns;

a plurality of touch signal lines, located on a side of the substrate; wherein each touch signal line of the plurality of touch signal lines is arranged corresponding to two adjacent pixel electrode columns of each of the pixel units, and an orthographic projection of each of the touch signal lines on the substrate falls within an orthographic projection of each of the pixel units on the substrate; and a plurality of first data signal lines, located on a side of the substrate;

wherein each first data signal line of the plurality of first data signal lines comprises a first sub-data signal line segment and a second sub-data signal line segment, one of the first sub-data signal line segment or the second sub-data signal line segment corresponds to one of any two adjacent pixel electrode rows, another of the first sub-data signal line segment or the second sub-data signal line segment corresponds to another of any two adjacent pixel electrode rows, and an extension direction of the first sub-data signal line segment is non-collinear with an extension direction of the second sub-data signal line segment; and wherein in two adjacent pixel electrode columns, an orthographic projection of a first sub-data signal line segment of a Mth first data signal line on the substrate is located between an orthographic projection of a Mth pixel electrode and an orthographic projection of a (M+1)th pixel electrode in a pixel electrode row, where the first sub-data signal line segment of the Mth first data signal line is located, on the substrate;

orthographic projections of the first sub-data signal line segment of the Mth first data signal line and a first sub-data signal line segment of a (M+1)th first data signal line on the substrate are located on both sides of an orthographic projection of the (M+1)th pixel electrode in a pixel electrode row, where the first sub-data signal line segment of the Mth first data signal line and the first sub-data signal line segment of the (M+1)th first data signal line are located, on the substrate in a first direction;

an orthographic projection of a second sub-data signal line segment of the (M+1)th first data signal line on the substrate is located between orthographic projections of the Mth pixel electrode and the (M+1)th pixel electrode in a pixel electrode row, where the second sub-data signal line segment of the (M+1)th first data signal line is located, on the substrate; and orthographic projections of a second sub-data signal line of the Mth first data signal line and the second sub-data signal line of the (M+1)th first data signal line on the substrate are located on both sides of an orthographic projection of the Mth pixel electrode in a pixel electrode row, where the second sub-data signal line of the Mth first data signal line and the second sub-data signal line of the (M+1)th first data signal line are located, on the substrate in the first direction.

* * * * *